United States Patent [19]
Davis et al.

[11] Patent Number: 5,742,829
[45] Date of Patent: Apr. 21, 1998

[54] AUTOMATIC SOFTWARE INSTALLATION ON HETEROGENEOUS NETWORKED CLIENT COMPUTER SYSTEMS

[75] Inventors: Michael L. Davis; Or Ben-Natan, both of Bellevue; Bruce W. Copeland, Redmond, all of Wash.

[73] Assignee: Microsoft Corporation, Redmond, Wash.

[21] Appl. No.: 403,246

[22] Filed: Mar. 10, 1995

[51] Int. Cl.$^6$ ........................................ G06F 9/45
[52] U.S. Cl. ........................................ 395/712
[58] Field of Search ........................ 395/700, 650

[56] References Cited

U.S. PATENT DOCUMENTS

| | | | |
|---|---|---|---|
| 5,019,963 | 5/1991 | Alderson et al. | 395/600 |
| 5,142,680 | 8/1992 | Ottman et al. | 395/700 |
| 5,144,692 | 9/1992 | Baker et al. | 395/650 |
| 5,155,847 | 10/1992 | Kirouac et al. | 395/700 |
| 5,247,683 | 9/1993 | Holmes et al. | 395/700 |
| 5,327,563 | 7/1994 | Singh | 395/700 |
| 5,361,358 | 11/1994 | Cox et al. | 395/700 |
| 5,367,686 | 11/1994 | Fisher et al. | 395/700 |
| 5,381,534 | 1/1995 | Shi | 395/700 |
| 5,421,009 | 5/1995 | Platt | 395/600 |
| 5,432,937 | 7/1995 | Tevanian et al. | 395/700 |
| 5,473,772 | 12/1995 | Halliwell et al. | 395/650 |
| 5,485,370 | 1/1996 | Moss et al. | 364/408 |

*Primary Examiner*—Emanuel T. Voeltz
*Assistant Examiner*—Peter J. Corcoran, III
*Attorney, Agent, or Firm*—Seed and Berry LLP

[57] ABSTRACT

The present invention provides for automatically installing software on heterogeneous client computer systems. In a distributed system having heterogeneous computer systems of different natural languages, different operating system types, and/or different processor types, the present invention automatically installs the appropriate edition of software onto client computers. The present invention installs an edition of software appropriate for execution on a particular processor type, with a particular operating system type and in a particular natural language by utilizing commands specific to an operating system type. The present invention automatically installs software in response to the availability of a new version of the software, a change in the operating system of the client computer, a change in the associated natural language of the client computer, or in response to input of the administrator of the distributed system.

29 Claims, 8 Drawing Sheets

AUTOMATIC SOFTWARE INSTALLATION ON HETEROGENEOUS NETWORKED CLIENT COMPUTER SYSTEMS

TECHNICAL FIELD

The present invention relates generally to data processing systems and, more particularly, to the automatic installation of software on heterogeneous client computer systems.

BACKGROUND OF THE INVENTION

Typically, large, multinational corporations have a distributed system containing many computers spread across a wide geographical area that are networked together. This type of environment makes it difficult and costly to manage the computers in terms of providing software installation, support and maintenance. That is, an administrator of the distributed system has to visit each computer in order to manage the computers. Thus, a significant cost of managing the computers in this type of environment stems from software installation, support, and maintenance. In fact, the initial purchase price of software may be only a small portion of the total cost associated with managing the computers.

The distributed systems of large corporations usually comprise computers that have dissimilar hardware and software components. The lack of uniformity in components is the product of different organizations within the corporation having different needs for their computers. For instance, one organization may consist primarily of clerical workers, who utilize various programs such as word processing programs or spreadsheet programs, that do not require significant processing power, whereas another organization in the corporation that performs engineering research utilizes more computationally intensive programs that require significantly more processing power. Therefore, a large corporation usually has computers with different types of processors to match the differing processing demands of its organizations.

With respect to different software components, the distributed systems of large corporations usually contain groups of computers that are interconnected via a local area network (LAN). Each group of computers typically represents an organization within the corporation. Each group of computers contains one or more server computers that runs a network operating system. A "network operating system" provides network services to other computers ("client computers") on the LAN, such as remote file access and remote printing capabilities. In many instances, different groups may have servers running different network operating systems.

The client computers within a group of computers are typically used by end users. End users often have preferences regarding what operating system runs on their computer. Therefore, in a distributed system of a large corporation having many end users, there are usually a number of computers with different operating systems.

Just as end users have a preference for a particular operating system, end users typically have a preference for a natural language in which communications between the end user and the computer are to take place. In a distributed system of a large, multinational corporation, it is common to have computers that employ different natural languages for communications with end users.

Systems have been developed that, upon user initiation, install software from a master computer to a slave computer, where both the master and the slave are homogeneous with respect to each other in that they have similar hardware and software components. However, these systems typically do not operate within a distributed system of computers that have dissimilar hardware and software components, such as is commonly found with large corporations. Therefore, although systems have been developed to facilitate the installation of software on homogenous computers, these systems do not suit the needs of a large corporation. Thus, large corporations and other organizations having a distributed system of heterogeneous computers are in need of a mechanism to facilitate the installation of software within their distributed system.

SUMMARY OF THE INVENTION

The system described herein provides for automatically installing software on heterogeneous client computer systems. In a distributed system having heterogeneous computer systems of different natural languages, different operating system types, or different processor types, the system described herein automatically installs the appropriate edition of software onto client computers. The system described herein installs an edition of software appropriate for execution on a particular processor type, suitable for use with a particular operating system and in a particular natural language by utilizing commands specific to an operating system type. The system described herein automatically installs software on a client when the natural language of the client changes, when the operating system of the client changes, when a new version of the software becomes available or in response to input of the administrator of the distributed system.

In accordance with a first aspect of the present invention, a method is provided for automatically installing software in a data processing system having a client computer and a server computer that provides network services to the client computer. In accordance with the first aspect of the present invention, the method provides an installation component at the client computer, where the client computer is heterogeneous with respect to the server computer and automatically determines when to install the software on the client computer by the installation component. When it is determined to install the software, the system described herein installs the software on the client computer by the installation component.

In accordance with a second aspect of the present invention, an automatic software installation system is provided. The automatic software installation system of the second aspect of the present invention provides a first computer that has an associated natural language and has a processor running an operating system. Further, the second aspect of the present invention provides a second computer for providing network services to the first computer after the first computer logs onto the second computer. The second computer further comprises a first component for storing editions of software and a second component for determining the natural language of the first computer, the operating system of the first computer and the processor of the first computer. In addition, the automatic software installation system includes a third component for installing an edition of the software onto the first computer that is suitable for execution on the processor of the first computer, suitable for execution with the operating system of the first computer and that utilizes the associated natural language of the first computer. The second computer installs the edition of the software by utilizing commands that are suitable for the operating system of the first computer in response to the first computer initiating a logon to the second computer.

DETAILED DESCRIPTION OF THE INVENTION

Figure 1:
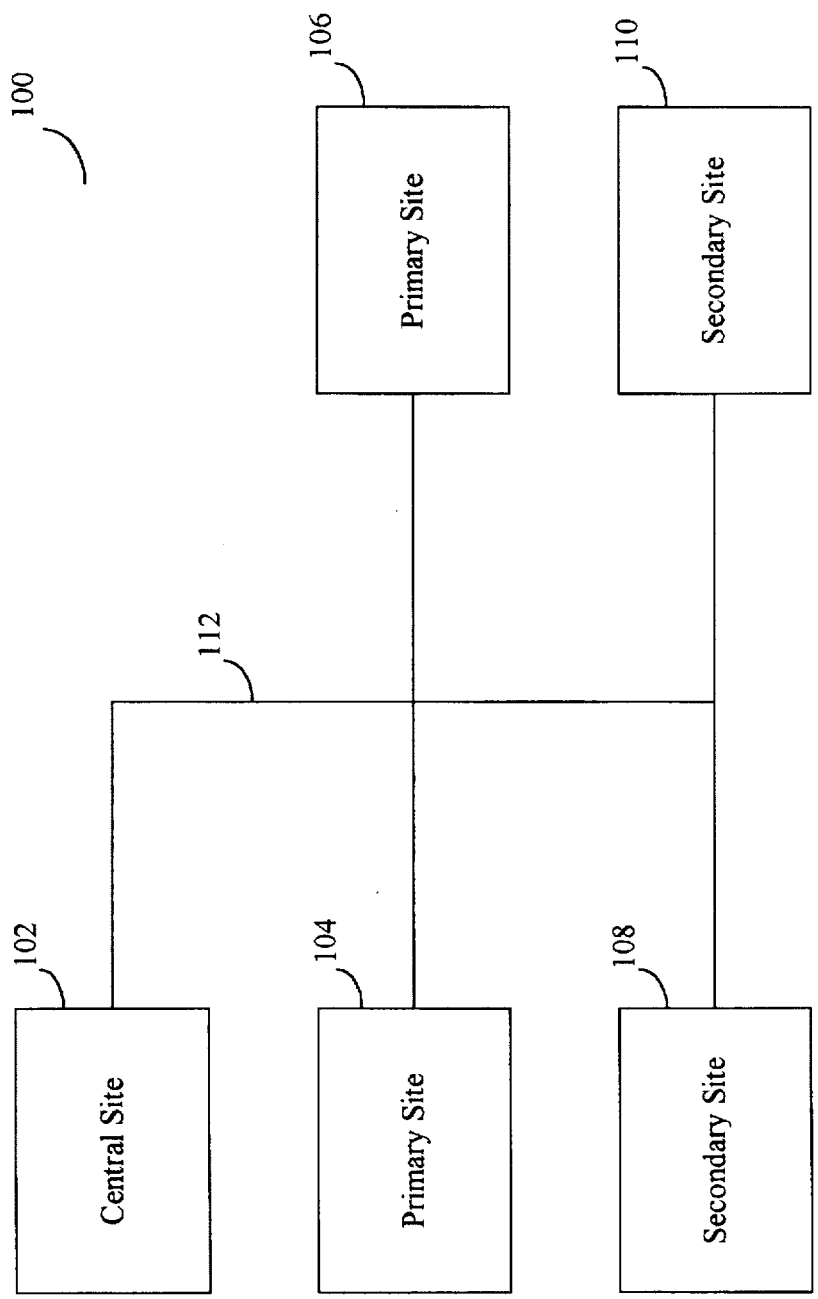
FIG. 1 depicts a distributed system suitable for practicing a preferred embodiment of the present invention.

A preferred embodiment of the present invention automatically installs software on client computers that are heterogeneous with respect to each other, as well as to server computers in a distributed system. The term "client computer" refers to a computer that utilizes another computer ("server computer") to gain access to network services, such as remote file access and remote printing capabilities. By automatically installing software on client computers, the preferred embodiment facilitates the management of computers in a distributed system of heterogeneous computers and reduces the cost associated therewith. Two computers are said to be "heterogeneous" with respect to each other if they have dissimilar hardware or software components or dissimilar configuration information. For example, two computers are considered heterogeneous if they have different operating systems, natural languages or processors.

The preferred embodiment of the present invention operates within the context of a centralized management system for distributed systems, such as the Systems Management Server available from Microsoft Corporation of Redmond, Wash., although one skilled in the art will appreciate that other embodiments of the present invention can operate in other types of systems. Thus, in order to more fully describe the preferred embodiment, it is necessary to provide a description of the centralized management system in which the preferred embodiment operates. The centralized management system provides hardware and software inventory support, software distribution and installation, software updates, and remote diagnostics. In providing hardware and software inventory support, the centralized management system provides a listing of the various hardware and software components on each of the computers in the distributed system. In providing software distribution and installation, the centralized management system centralizes the management and installation of application programs on file servers and clients. The software update functionality performed by the centralized management system installs a new version of the software when the current version of the software becomes outdated. The installation of the new version of software is performed on each computer that needs the new version. A "version" of software refers to the release of the software, which is typically indicated by a number such as 1.0. In providing the remote diagnostics functionality, the centralized management system allows an administrator of the distributed system to take control of the input devices and the display of a remote computer so as to be able to diagnose problems with the computer.

As previously stated, the distributed system in which the preferred embodiment operates contains heterogeneous computers. These computers can have different natural languages, network operating systems, operating systems, and processors. With respect to natural languages, for purposes of explaining the preferred embodiment, an illustrative case is described below using English and German, although the present invention can be used with other natural languages.

With respect to network operating systems, operating systems and processors, the preferred embodiment operates in an environment of server computers and client computers. In some instances, servers and clients may be configured differently, thus the configuration of each is described separately. With respect to the configuration of server computers, the preferred embodiment supports the "MICROSOFT WINDOWS NT" network operating system available from Microsoft Corporation of Redmond, Wash., the "LAN MANAGER" network operating system also available from Microsoft Corporation, the "LAN SERVER" network operating system available from the International Business Machines Corporation of Armonk, N.Y. and the "NetWare" network operating system available from the Novell corporation of Provo, Utah. The operating systems supported by servers of the preferred embodiment include "MICROSOFT WINDOWS NT," Microsoft Operating System 2, and "MS-DOS" which are all available from Microsoft Corporation and IBM "OS/2" which is available from the IBM Corporation. "MICROSOFT WINDOWS NT" operates as both a network operating system by providing access to remote resources such as printers and files, as well as a local operating system by providing access to local resources. The processors supported by servers of the preferred embodiment include the X86 family of processors available from the Intel Corporation of Cupertino, Calif., the MIPS R4000 family of processors available from MIPS Technologies of Mountain View, Calif. and the Alpha family of processors available from the Digital Equipment Corporation of Maynard, Mass. The various combinations of network operating systems, operating systems and processors supported by servers of the preferred embodiment are depicted below in Table 1.

TABLE 1

| Network Operating System | Windows NT | LAN Manager | LAN Server | Netware |
|---|---|---|---|---|
| Operating system | Windows NT | MS OS/2 | IBM OS/2 | MS-DOS |
| Processor | Intel X86 DEC Alpha MIPS R4000 | Intel X86 | Intel X86 | Intel X86 |

As can be seen from the above table, the preferred embodiment supports a server computer running "MICROSOFT WINDOWS NT" on the X86, Alpha or MIPS families of processors. Also, the preferred embodiment supports a server computer running "LAN MANAGER" and MS Operating System 2 on the Intel X86 family of processors, a server computer running "LAN SERVER" and IBM "OS/2" on the Intel X86 family of processors and a server computer running "Netware" and "MSDOS" on the Intel 86 family of processors. One skilled in the art will appreciate that the present invention can be used with other network operating systems, operating systems and processors or additional combinations thereof.

The various configurations of clients supported by the preferred embodiment are depicted below in Table 2.

TABLE 2

| Operating System | Windows NT | MS-DOS | Windows | IBM OS/2 | MS OS/2 |
|---|---|---|---|---|---|
| Processor | Intel X86 DEC Alpha MIPS R4000 | X86 | X86 | X86 | X86 |

As can be seen from Table 2, clients of the preferred embodiment support the "MICROSOFT WINDOWS NT" operating system, the "MS DOS" operating system, the "MICROSOFT WINDOWS" operating system available from Microsoft Corporation, the IBM "OS/2" operating system and the Microsoft Operating System 2. Also, when a client utilizes the "MICROSOFT WINDOWS NT" operating system, the client can support the Intel X86, Alpha or MIPS family of processors. When utilizing the other operating systems, the client supports the X86 family of processors. Although specific combinations of operating systems and processors have been described with respect to client computers of the preferred embodiment, one skilled in the art will appreciate that client computers of the present invention can utilize different operating systems and processors or additional combinations thereof.

A block diagram of the distributed system in which the preferred embodiment operates is depicted in FIG. 1. The distributed system 100 contains a central site 102, two primary sites 104, 106 and two secondary sites 108, 110 with each site connected to a communication mechanism 112, such as a wide area network. Each site, in turn, contains a number of computers connected via a local area network. The central site 102 manages all other sites and therefore stores system-wide information. The primary sites 104, 106 typically manage one or more secondary sites 108, 110. For example, the primary site 104 may manage secondary site 108 and the primary site 106 may manage secondary site 110. The sites are arranged hierarchically with the central site at the top of the hierarchy managing all other sites and the primary sites are next in the hierarchy managing the secondary sites.

Figure 2:
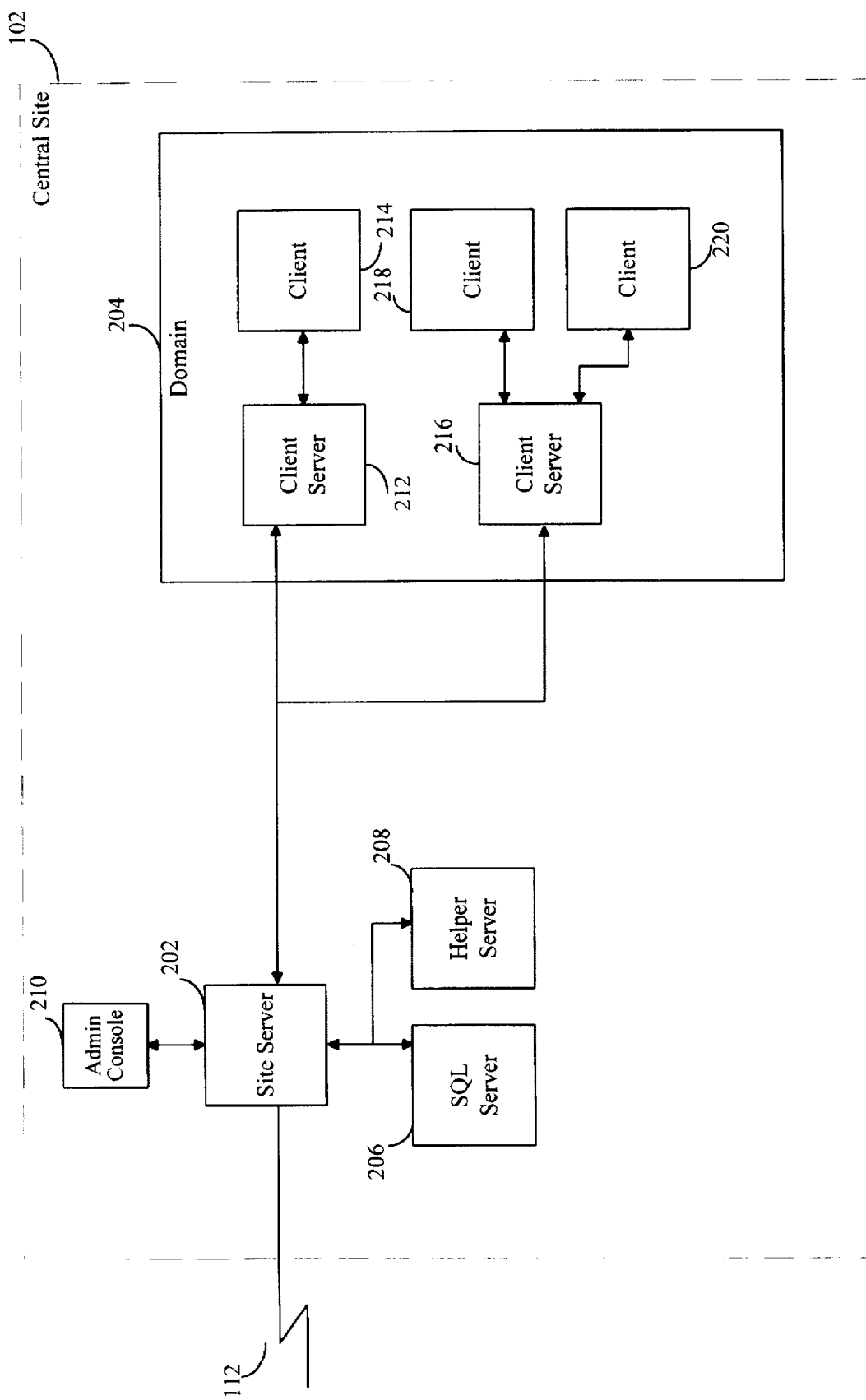
FIG. 2 depicts a more detailed block diagram of the central site of FIG. 1.

A more detailed block diagram of the central site of FIG. 1 is depicted in FIG. 2. The central site 102 is connected to one or more primary sites via a communication mechanism 112. The central site 200 contains a site server 202, an SQL server 206, a helper server 208, and a domain 204. The site server 202 of the central site 102 acts as the centralized management system for the central site and all other sites. An administrator's console 210 is connected to the site server 202 so that the administrator can centrally manage the distributed system. In addition, the site server 202 stores software that can be installed on other computers in the distributed system. The SQL server 206 manages a database that contains various inventory information and status information regarding the distributed system. The helper server 208 is used to offload some of the burden of managing the distributed system from the site server 202. The domain 204 is a grouping of computers and contains two client servers 212 and 216, which are connected to client computers 214, 218, and 220. The client servers 212 and 216 act as file servers for the client computers 214, 218, and 220, which are, in turn, used by end users. The client computers 214, 218 and 220 can be heterogeneous with respect to each other in that the clients may have different operation systems, processors or natural languages. Although the central site has been described as having various components, one skilled in the art will appreciate that the central site can contain additional or different components such as additional helper servers, additional domains, additional client servers within a domain, and additional clients for each client server.

Primary and secondary sites are configured like the central site except that the secondary sites do not contain SQL servers. Therefore, both primary sites and secondary sites usually contain a site server, one or more helper servers, as well as one or more domains and the primary sites additionally contain an SQL server. Each domain may contain one or more client servers connected to one or more clients. The site server for a primary site is used for managing the primary site in which it is located as well as all secondary sites that are lower in the hierarchy. However, the site server of the central site acts as the centralized management mechanism of the entire distributed system, thereby managing all sites.

Figure 3A:
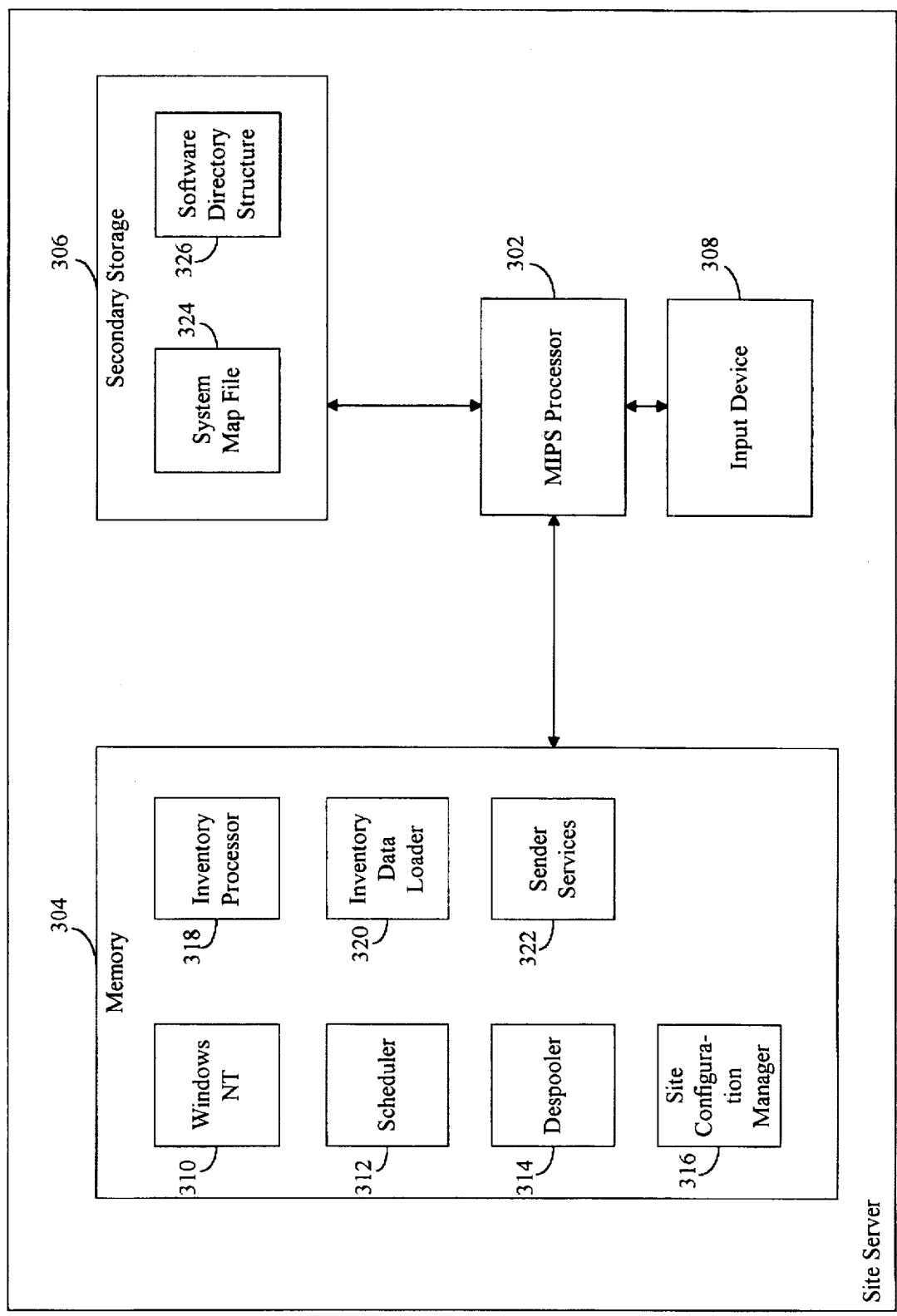
FIG. 3A depicts a more detailed block diagram of a site server of FIG. 2.

FIG. 3A depicts a more detailed block diagram of the site server 202 of FIG. 2. The site server 202 contains a central processing unit (CPU) 302, such as a MIPS R4000 processor, a memory 304, a secondary storage device 306, such as a hard disk, and an input device 308, such as a keyboard. Although the site server 202 is described with respect to having specific components, one skilled in the art will appreciate that the site server may have additional or different components. For example, the site server 202 can utilize a CPU such as an X86 or Alpha CPU. The memory 304 contains a copy of "MICROSOFT WINDOWS NT" 310, a number of services 312, 314, 318, 320, 322 that provide the functionality of the centralized management system, and a site configuration manager 316 that is further described below. "MICROSOFT WINDOWS NT" 310 acts as both a network operating system and a local operating system to the site server. A "service" is a computer program that typically runs as a background task and performs a system function, such as a function related to the centralized management system described herein. The services that provide the functionality of the centralized management system include the scheduler 312, the despooler 314, the inventory processor 318, the inventory data loader 320, and the sender services 322. The scheduler 312 is responsible for scheduling jobs such as software updates to occur across the distributed system and when the time has arrived for the job to be performed, the despooler 314 is responsible for performing the job by distributing the software to one or more computers within the site. The inventory processor 318 is responsible for receiving inventory information from the computers within a domain and passing the data to the inventory data loader 320. The inventory data loader 320 is responsible for receiving the data, correlating the data, and storing the data into a database on the SQL server. The sender services 322 is responsible for performing site-to-site communications. The sender services, therefore, provide communication over various connections such as ISDN or X.25. It should be noted that only one instance of the scheduler 312, the despooler 314, the inventory processor 318, and the inventory data loader 320 are present within the site at any given time. However, more than one sender services 322 may be present within a site since the site may, in turn, be connected to other sites.

The secondary storage 306 contains a system map file 324 and a software directory structure 326. The system map file 324 lists the software that is stored on the site server 202 and the directories in which the software is stored. In addition, the system map file 324 indicates the specific edition of the software. An "edition" of software refers to a copy of the software that operates using a particular natural language and that is suitable for execution with a particular type of operating system on a particular type of processor. For example, an application program may have two editions, a first edition in German for use with OS/2 on an X86 processor and a second edition in English for use with "MICROSOFT WINDOWS NT" on an Alpha processor. More than one edition of the software is typically stored on the site server 202 according to the natural language in which it is to operate, the operating system with which it is to operate and the platform (or processor) on which it is to execute. The various editions of the software are stored in the software directory structure 326. The software directory structure 326 is created upon installation of the centralized management system. When installing the centralized management system, a compact disk is inserted into the site server 202 and as part of the installation process, the software directory structure 326 is created and the software contained on the compact disk is copied therein. The software directory structure 326 has a main directory "site.srv" with various directories of the main directory that each contain portions of an edition of the software that are natural language independent. That is, software usually comprises a number of files ("portions"), some of which are natural language independent and others are natural language dependent. The natural language independent portions are stored in the directories and the natural language dependent portions are stored in subdirectories within the directories. An example of a service stored in the software directory structure 226 is depicted below in Table 3.

TABLE 3

```
..\site.srv
    \x86.bin
        servos2.exe
        servnt.exe
        serv.dll
        \00000409
            servlang.dll
        \00000407
            servlang.dll
    \mips.bin
        servnt.exe
        serv.dll
        \00000409
            servlang.dll
        \00000407
            servlang.dll
    \alpha.bin
        servnt.exe
        serv.dll
        \00000409
            servlang.dll
        \00000407
            servlang.dll
```

As can be seen from Table 3, the main directory site.srv has three directories \x86, \mips, and \alpha. Each directory contains software that is specific to a particular type of processor and within each directory are editions of the software for a particular operating system, such as "servos2.exe" for use with "OS/2" and "servnt.exe" for use with "MICROSOFT WINDOWS NT." Each directory then, in turn, has a subdirectory 00000409 and a subdirectory 00000407. Each of these numbers indicates a specific language code that refers to a natural language. For example, the number 00000407 indicates the German language and the number 00000409 indicates the English language. These subdirectories contain one or more portions of the edition of the software that are language dependent. Therefore, within the \x86 directory, servos2.exe, servnt.exe and serv.dll are language independent portions of the software that are suitable for execution on the X86 family of processors, with servos2.exe suitable for use with "OS/2" and servnt.exe suitable for use with "MICROSOFT WINDOWS NT." Further, subdirectories 00000409 and 00000407 of the \x86 directory contain the language dependent portions of the software that are suitable for execution on the X86 family of processors. Although the software for one service has been depicted, all of the other software that is available from the site server (including programs that are to be installed on clients) is stored in this manner. For example, with respect to an additional service, the \x86 directory would contain the language independent portions of the additional service that run on the X86 family of computers (with one edition for each operating system supported), and the subdirectories 00000409 and 00000407 would contain the language dependent portions of the additional service.

The configuration of the helper server is similar to that of the site server. That is, the helper server has similar hardware components to that of the site server, although one skilled in the art will appreciate that the helper server can have additional or different components. However, the services used by the centralized management system do not typically run on the helper server unless they are specifically moved on to the helper server.

Figure 3B:
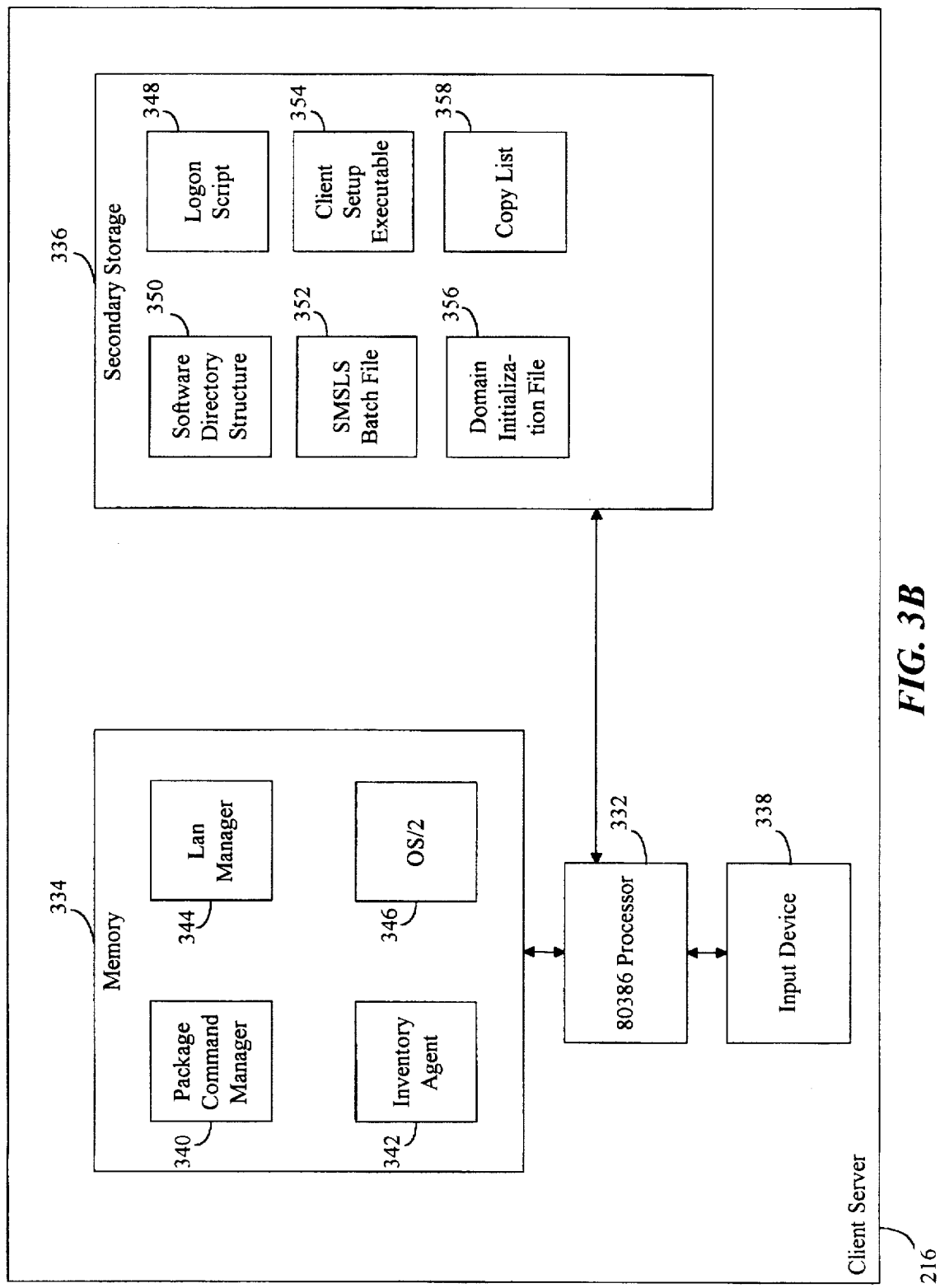
FIG. 3B depicts a more detailed block diagram of a client server of FIG. 2.

FIG. 3B depicts a more detailed block diagram of the client server 216 of FIG. 2. Although client server 216 is depicted, the other client servers, including client server 212, are similarly configured. The client server 216 has an 80386 processor 332, a memory 334, a secondary storage device 336, and an input device 338, such as a keyboard. One skilled in the art will appreciate that the client server 216 may have additional or different components, such as a MIPS processor, an Alpha processor or a different processor from the X86 family of processors. The memory 334 contains a network operating system, such as "LAN MANAGER", 344 and an operating system, such as IBM "OS/2", 346. It should be appreciated that the client server 216 of the present invention can operate other combinations of network operating systems and operating systems. In addition, the memory 334 contains services that help provide the functionality of the centralized management system including the package command manager 340 and the inventory agent 342. The package command manager 340 provides the functionality of automatically installing application programs onto the client server 216. The inventory agent 342 provides the functionality of retrieving the hardware and software inventory of the client server 216 and sending this inventory information to the site server wherein the information is utilized by the inventory processor of the site server.

The secondary storage device 336 contains a software directory structure 350, a logon script 348, an SMSLS batch file 352, a client setup executable 354, a domain initialization file 356 and a copy list file 358. The directory structure 350 stores all of the software currently installed on the client server 216, as well as the software to be installed on the clients. The logon script 348 is invoked by the client to logon to the client server. Therefore, the logon script 348 is responsible for requesting the client server to perform user password validation and the logon script performs other functionality associated with the logon process. After logging on, the "LAN MANAGER" 344 network operating system provides network services to the client. As part of the processing of the logon script 348, the logon script invokes the SMSLS batch file 352. The SMSLS batch file 352 actually has a number of copies, with each copy specific to one or more operating systems. The SMSLS batch file 352 will be further described below. The client setup executable 354 is invoked by the SMSLS batch file 352 to install software onto the client computer. The client setup executable 354 accesses the domain initialization file 356 to retrieve a current list of software ("the program list") to be loaded onto the client and utilizes the copy list 358 to load the software. The program list is used by the preferred embodiment to determine whether software should be loaded or deleted from clients. When the administrator determines to alter (i.e., add to or delete from) the software currently loaded on the clients within a domain, the administrator instructs the site configuration manager, which is responsible for modifying the program list in the domain initialization file. The domain initialization file 356 has an entry, "components," that contains the program list. As will be described below, if the program list differs from what is actually installed on a client, during the process of logging onto the client server, the preferred embodiment will make what is actually loaded on the client conform to the program list. This occurs by the preferred embodiment installing software that is listed, but not currently loaded on the client and by the preferred embodiment deleting software that is not listed, but which is currently loaded on the client. In addition to the program list, the domain initialization file 356 contains various configuration information of the domain, such as how often the hardware and software of the computers within the domain should be inventoried. The copy list file 358 contains entries indicating the location of the software within the software directory structure 350 of the client server 216, as well as the destination directory of the client, where the software should be copied in order to execute properly. The layout of the software directory structure 350 is similar to that of the software directory structure described relative to the site server.

Figure 3C:
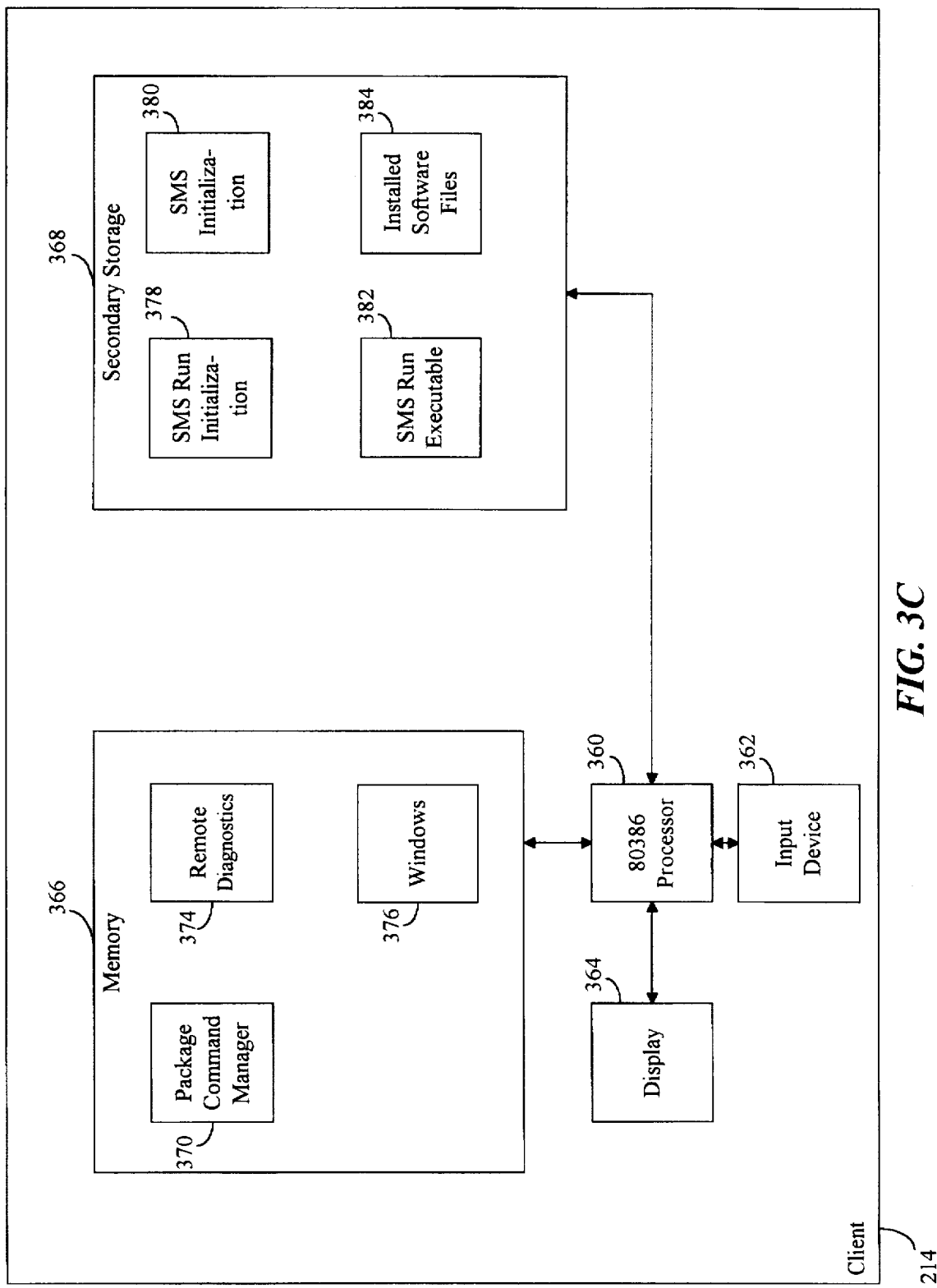
FIG. 3C depicts a more detailed block diagram of a client computer of FIG. 2.

FIG. 3C depicts a more detailed block diagram of the client 214 of FIG. 2. Although the client 214 of FIG. 2 is depicted, the other client computers 218, 220 are similarly configured. The client 214 has an 80386 processor 360, a memory 366, a secondary storage device 368, a display 364, and an input device 362. Although the client 214 is described as having an 80386 processor 360, one skilled in the art will appreciate that the client computer of the present invention can utilize different processors. The memory 366 contains the package command manager 370, remote diagnostics 374, and "MICROSOFT WINDOWS" 376. The package command manager 370 provides the ability for an end user to have application programs downloaded to their computer and automatically installed. The remote diagnostics 374 allows the administrator to remotely control the client 214 so as to detect problems with the client. Both the package command manager 370 and the remote diagnostics 374 were installed by the preferred embodiment of the present invention as described below. The secondary storage device 368 contains an SMS initialization file 380, an SMS run initialization file 378, an SMS run executable 382, and installed software files 384. The SMS initialization file 380 contains an identifier of the current version of the software that performs the functionality of the centralized management system, which includes the package command manager 370 and the remote diagnostics 374. The SMS initialization file 380 also contains the list of all software currently installed by the centralized management system on the client 214.

The SMS run initialization file 378 contains a list of software to be automatically started during the logon to the client server. The SMS run executable 382 is invoked by "MICROSOFT WINDOWS" 376 and accesses the SMS run initialization file 378 to start the software contained therein upon logon to the client server. It should be noted that the SMS run initialization file 378 and the SMS run executable 382 are used to start the software upon logon when "MICROSOFT WINDOWS" is running as the operating system of the client. When other operating systems are used, as described below, the preferred embodiment uses other techniques to start the software.

As previously stated, the preferred embodiment of the present invention provides for the automatic installation of software on a client computer that is heterogeneous with respect to other client computers as well as to the client server. The preferred embodiment of the present invention performs this functionality within the context of the centralized management system described above. However, one skilled in the art will appreciate that the techniques used by the preferred embodiment of the present invention for automatically installing software can be utilized within other environments. The preferred embodiment of the present invention can be used to copy software (or programs) that perform functionality related to the centralized management system from the client server to the client and start the programs after copying them. The preferred embodiment performs this functionality either automatically or in response to input of the administrator. The preferred embodiment performs this functionality automatically when the client changes natural languages between logons, when the client changes operating systems between logons or when the version of the software currently loaded on the client becomes outdated. Thus, the preferred embodiment provides the user with the flexibility of booting up the client under different operating systems or natural languages and the preferred embodiment will automatically utilize the correct edition of the centralized management system software. In addition, the preferred embodiment provides for automatically updating the version of the centralized management system software without the end user being involved. This facilitates the management of client computers.

Figure 4:
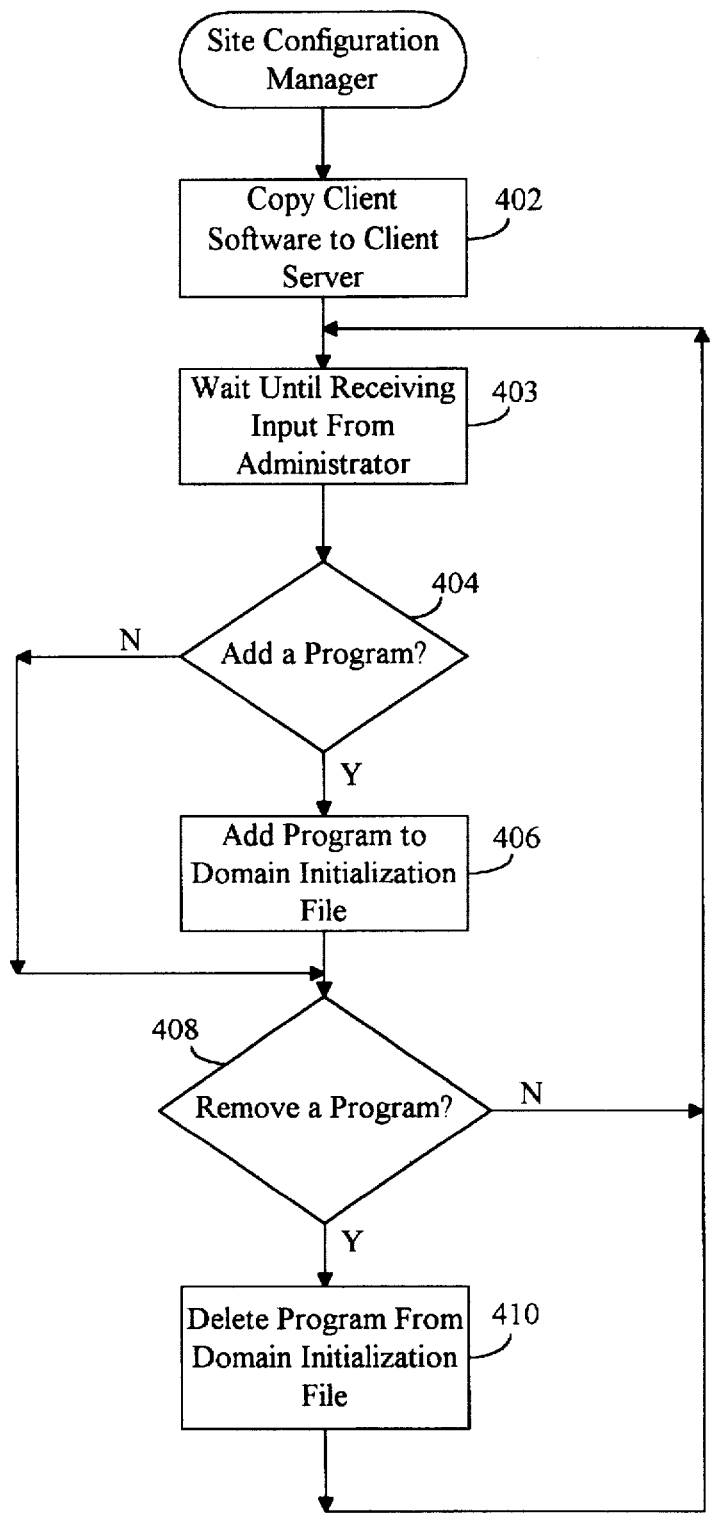
FIG. 4 depicts a flowchart of the steps performed by the site configuration manager of the preferred embodiment of the present invention.

FIG. 4 depicts a flowchart of the steps performed by the site configuration manager of the present invention. The site configuration manager, upon startup, copies all of the software to be installed on clients to the client servers within a domain. In addition, the site configuration manager is utilized by the administrator of the distributed system in order to alter the program list that identifies programs that are installed on clients within a domain. Further, the site configuration manager also performs processing with respect to client servers as described in co-pending U.S. patent application Ser. No. 08/403,244, entitled "Automatic Software Installation on Heterogeneous Networked Computer Systems," which is hereby incorporated by reference. The first step performed by the site configuration manager of the preferred embodiment is to copy all client software from the software directory structure of the site server to the software directory structure of the client server (step 402). In this step, the site configuration manager accesses the software directory structure of the site server, creates a similar directory structure on the client server, and then copies the software that is to run on the client to the client server directory structure. This software includes the package command manager and remote diagnostics, as described above.

After copying the client software, the site configuration manager waits until receiving administrator input (step 403).

In this step, the site configuration manager waits until receiving input from the administrator indicating whether to add a program to the program list within the domain initialization file or whether to remove a program from the program list. In other words, the input indicates whether an additional program should be loaded onto the clients of a domain or whether a program that currently runs on the clients of a domain should be removed from the clients. The site configuration manager then determines whether the received administrator input indicates that a program should be added to the program list (step 404). If the input does not indicate adding a program to the program list, processing continues to step 408. If the input does indicate adding a program to the program list, the site configuration manager adds the program to the program list of the domain initialization file (step 406). Next, the site configuration manager determines whether the input indicates to remove a program from the program list (step 408). If the input does not indicate removing a program from the program list, processing continues to step 403. If the site configuration manager determines that the input of the administrator does indicate removing a program from the program list, the site configuration manager deletes the program from the program list of the domain initialization file so that during the next logon of the client, the preferred embodiment will delete the program from the client (step 410). After deleting the program from the program list, processing continues to step 403, where the site configuration manager waits until receiving administrator input.

Figure 5A:
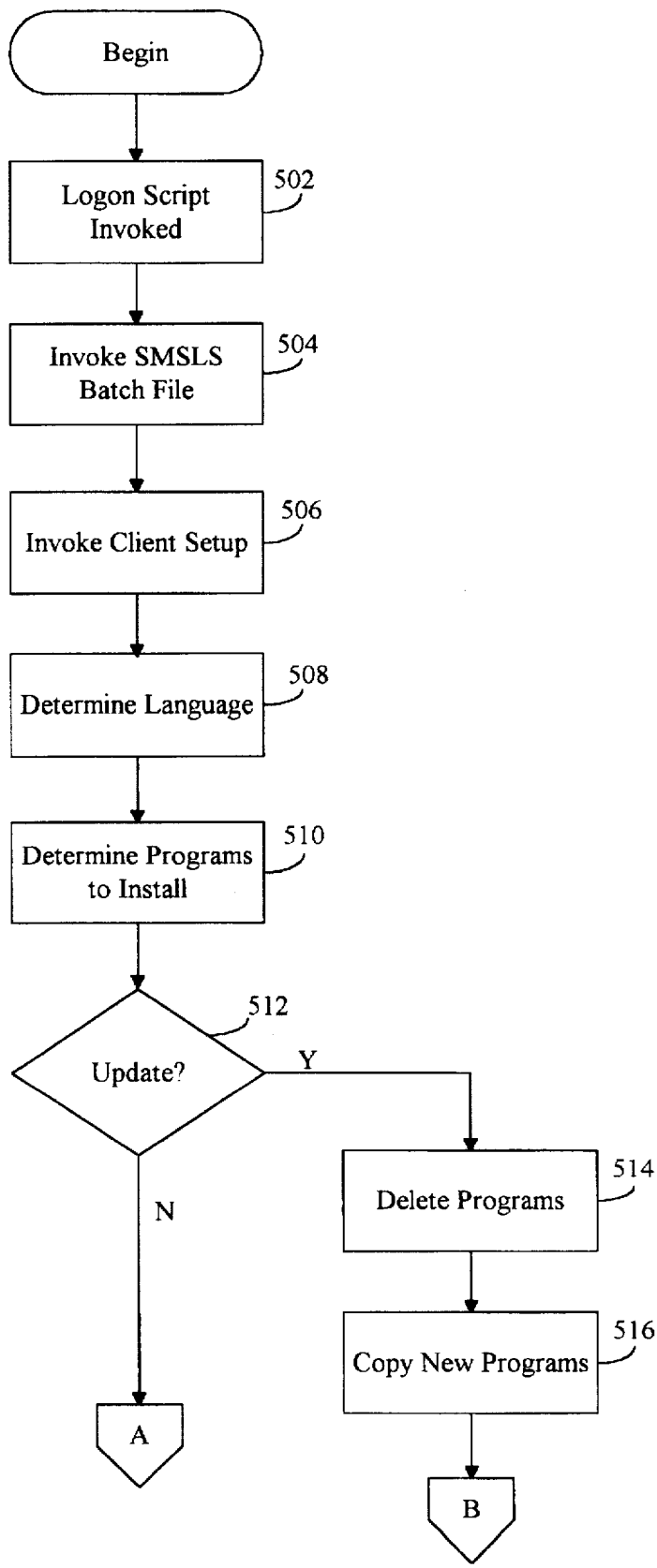
FIGS. 5A and 5B depict a flowchart of the steps performed by the preferred embodiment of the present invention when automatically installing software onto a client computer.
Figure 5B:
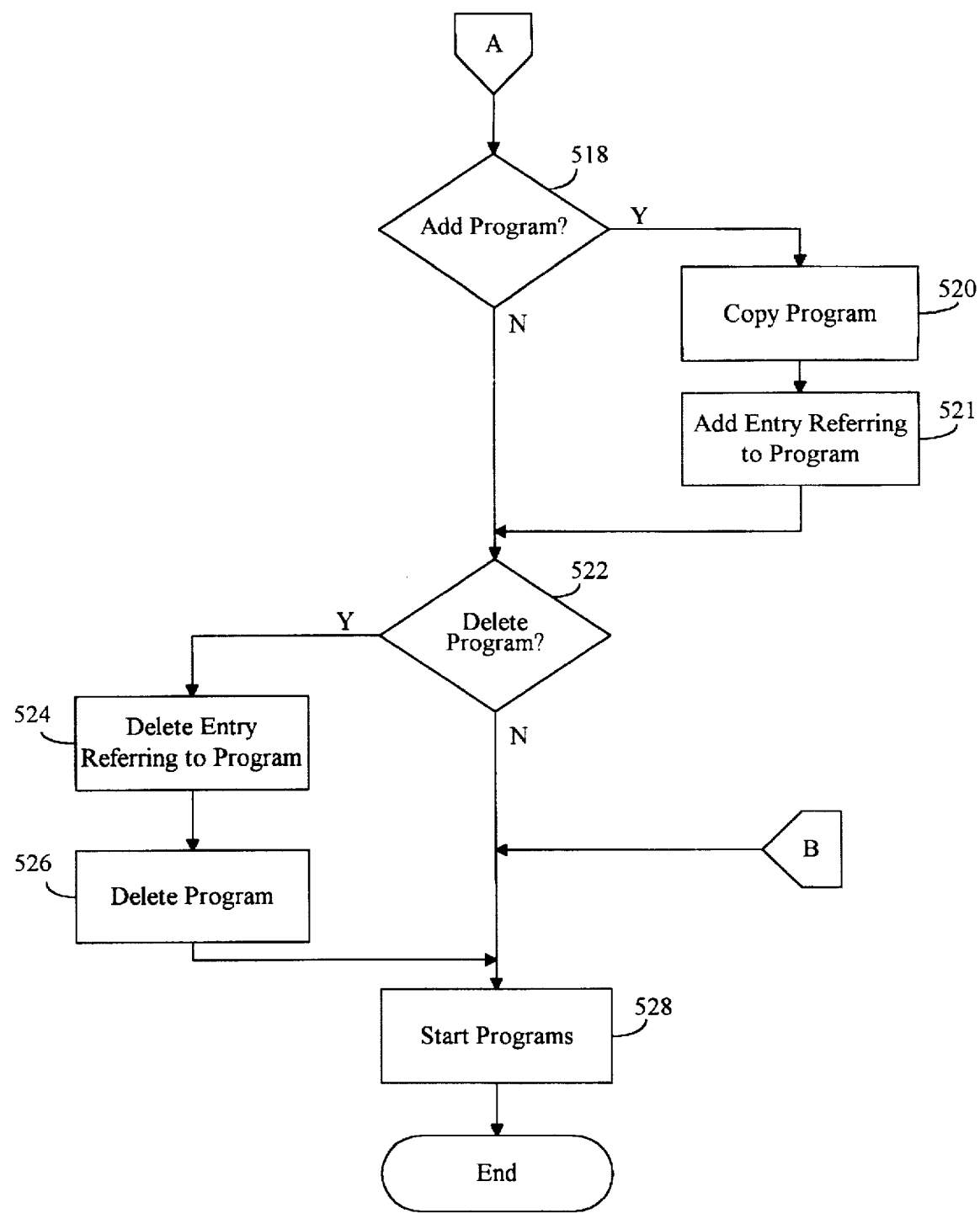

FIGS. 5A and 5B depict a flowchart of the steps performed by the preferred embodiment of the present invention when automatically installing software on client computers. The preferred embodiment of the present invention automatically installs software on client computers, as well as deinstalls (or deletes) software from client computers when the client computers logon to their respective client server. In automatically installing software on the client computers, the preferred embodiment performs this installation when the natural language of the client computer changes between logons, the operating system of the client computer changes between logons, the version of the software on the client computer becomes outdated, or in response to input of the administrator. The first step performed by the preferred embodiment of the present invention is that the logon script is invoked when the end user of the client computer attempts to logon to the client server (step 502). Upon the invocation of the logon script, the logon script requests the client server to perform user validation, as well as other functionality associated with the logon process.

After the logon script is invoked, the logon script invokes the SMSLS batch file (step 504). The SMSLS batch file is specific to one or more operating systems. That is, one copy of the SMSLS batch file is specific to "MS DOS," "MICROSOFT WINDOWS," and "MICROSOFT WINDOWS NT." Another copy of the SMSLS batch file is specific to "OS/2." The logon script executes the SMSLS batch file by invoking "SMSLS" without specifying an extension. The operating system of the client then automatically inserts the appropriate extension for the execution of the batch file. That is, although the SMSLS batch file and other files and executables described below are located on the client server, the processing (or execution) of these files occurs on the processor of the client computer. In "MS DOS," "MICROSOFT WINDOWS," and "MICROSOFT WINDOWS NT" the extension used is ".bat." Alternatively, the extension used for either the Microsoft Operating System 2 or the IBM "OS/2" operating system is ".cmd."

The copy of the SMSLS batch file for MS DOS, "MICROSOFT WINDOWS," and "MICROSOFT WINDOWS NT" first determines if "MICROSOFT WINDOWS" is installed by looking for the file "win.com." This file acts as the loader for "MICROSOFT WINDOWS" and, therefore, will be present if "MICROSOFT WINDOWS" is installed. If win.com is not found, it is assumed that "MICROSOFT WINDOWS" is not installed. Then, the SMSLS batch file determines if "MICROSOFT WINDOWS NT" is installed by examining an environment variable "OS." This environment variable would be set to WINDOWS NT if "MICROSOFT WINDOWS NT" is installed. An environment variable is stored within the NT registry of "MICROSOFT WINDOWS NT." The NT registry is a central repository in "MICROSOFT WINDOWS NT" for all information about the computer hardware, the computer software, and the users of the distributed system. The NT registry consists of a number of files, where each file corresponds to a discrete unit of registry information. Data in the registry is structured as a hierarchically structured tree, with each node of the tree referred to as a key. Each key can contain both subkeys and data. When accessing the data of a key, in some instances, the key can be referred to directly to access the data and, in other instances, a key must be opened before accessing the data associated with the key. When opening a key, the handle of another key must be supplied in the registry that is already open. The NT registry provides four standard handles that are always open and, thus, act as entry points to the registry. The first standard handle is HKEY_CLASSES_ROOT which provides information relating to classes of documents and properties associated therewith. The HKEY_CURRENT_USER standard handle contains environment variables that contain preferences of the user relating to the system environment such as the natural language. The HKEY_LOCAL_MACHINE standard handle contains configuration information of the system, including information about the bus type, system memory operating system, processor, natural language and installed software. The HKEY_USERS standard handle contains configuration information of the local computer and user configuration information for the current user. If it is determined that neither "MICROSOFT WINDOWS" nor "MICROSOFT WINDOWS NT" is installed, it is assumed that "MS DOS" is the operating system of the client.

If it is determined that "MICROSOFT WINDOWS NT" is the operating system of the client, the SMSLS batch file determines the processor type of the client by examining the environment variable "PROCESSOR_ARCHITECTURE." The examination of this environment variable then determines which processor is executing on the client. It should be noted that if the client is running either the "MS DOS" or the "MICROSOFT WINDOWS" operating system, the processor type does not need to be determined since these operating systems typically run on the X86 family of processors. With respect to the copy of the SMSLS batch file for OS/2, neither the operating system nor the type of processor needs to be determined since this batch file is specific to the OS/2 operating system, which runs on the X86 family of processors.

As part of the SMSLS batch file, regardless of the copy of the SMSLS batch file, the batch file invokes the client setup executable (step 506). In this step, the SMSLS batch file invokes the appropriate edition of the client setup executable. That is, the client setup executable has various editions depending on the type of processor and the operating system with which the client setup executable is to run. As previously stated, the client setup executable copies the files representing the programs in the program list of the domain initialization file onto the client. In addition, the client setup executable instructs the operating system of the client to start the programs when the operating system starts up. As part of invoking the client setup executable, it may be necessary to determine the client server of the client. That is, in some environments such as the "MICROSOFT WINDOWS NT" environment, one client server within the domain acts as a logon server that performs logon validation and runs the logon scripts for the entire domain. Therefore, it is necessary to determine the client server of the client in order to run the client setup executable which is located on this client server. In this situation, the logon server has an indication in an initialization file of the client server for the client. Using this indication, the client server containing the client setup executable for the client is located. The client setup executable, after invocation, determines the natural language of the client computer (step 508). In this step, if the client computer executes the "MICROSOFT WINDOWS NT" operating system, an indication of the natural language of the client computer is found by invoking the GetUserDefaultLangID call. "MICROSOFT WINDOWS NT" stores an identifier of the natural language of the user and this call provides access to the identifier. If the client executes with the "MICROSOFT WINDOWS" operating system, the win.ini file contains an indication of the natural language of the client computer. The win.ini file, contains initialization information and default settings such as the natural language associated with the client. Thus, the win.ini file is accessed to determine the natural language associated with the client. If the client computer utilizes the "MS DOS" operating system, the natural language of the client computer is determined by using an interrupt 21H function 38H, which is well known. If the client computer utilizes the Microsoft Operating System 2 operating system or the "OS/2" operating system, the natural language of the client is obtained by invoking the DosGetCtyInfo well-known OS/2 call.

After determining the natural language of the client computer, the preferred embodiment determines the programs that should be installed on the client computer (step 510). In this step, the client setup executable accesses the domain initialization file and examines the components entry, which contains the program list. In addition, the client setup executable accesses the build number (i.e., the version number) of the programs associated with the centralized management system. After retrieving the program list and the build number from the domain initialization file, the client setup executable determines if an update needs to occur (step 512). In the preferred embodiment of the present invention, an update needs to occur when a new version of the software associated with the centralized management system is available (i.e., the current version becomes outdated), as well as when the operating system of the client has changed or the natural language of the client has changed since the last logon of the client. In this step, the client setup executable determines if a new version of the software associated with the centralized management system is available by comparing the build number contained in the domain initialization file with the build number contained in the SMS initialization file. If the build numbers do not match, an update needs to occur. The SMS initialization file also contains the operating system and natural language upon the last invocation of the client setup executable. Therefore, in determining if the operating system or the natural language of the client computer has changed, the client setup executable compares the operating system type and natural language determined above with the operating system and the natural language contained in the SMS initialization file. If the operating system types or the natural languages do not match, an update needs to occur. If an update does not need to occur, processing continues to step 518 of FIG. 5B.

If an update does need to occur, the client setup executable deletes the programs contained in the program list from the client computer (step 514). The client setup executable knows the location of the programs from the copy list file. After deleting the programs, the client setup executable copies the programs from the client server software directory structure to the client (step 516). In copying the programs when an update occurs, the preferred embodiment selects an edition of the programs that is appropriate for execution on the processor of the client, that is appropriate for use with the operating system of the client and that is appropriate for use with the natural language of the client. In addition, if either the natural language or the operating system of the client changed, the SMS initialization file is updated to reflect the changes. Next, the client setup executable determines if a program needs to be added to the client (step 518 of FIG. 5B). This determination is made by comparing the program list contained within the domain initialization file against the list of programs currently installed as indicated in the SMS initialization file. If it is determined to not add a program, processing continues to step 522.

If it is determined to add a program to the client, the client setup executable copies the appropriate edition of the program to the client (step 520). In copying the edition of the program, the client setup executable determines the appropriate edition of the program in terms of the processor, operating system and natural language of the client, accesses the software directory structure on the client server, retrieves the appropriate edition from the software directory structure and copies the edition of the program onto the client at the location specified by the copy list file. In addition, the preferred embodiment updates the SMS initialization file to indicate that the copied program is now installed. After copying the appropriate edition of the program, the preferred embodiment adds an entry referring to the program which instructs the operating system of the client to start the program upon startup of the operating system (step 521). That is, the client setup executable indicates to the operating system of the client the programs to start up when the operating system starts up. When the client operates the "MICROSOFT WINDOWS NT" operating system, the client setup executable puts an entry into the NT registry. The entry is placed at the key HKEY_CURRENT_USER\Software\Microsoft\WindowsNT\CurrentVersion\Windows so that upon startup of "MICROSOFT WINDOWS NT," the program is automatically started. In other words, "MICROSOFT WINDOWS NT" examines this key upon startup and invokes all programs indicated at this key. If the client runs either the Microsoft Operating System 2 operating system or the IBM "OS/2" operating system, the client setup executable places an entry into the win.ini file that indicates the programs to invoke when the operating system starts up. There is a section in the file indicated as "[windows]" under which is a keyword "load=." In order to have a program automatically started upon startup of the Microsoft Operating System 2 or the IBM "OS/2" operating systems, the path of the program is inserted after the "load=" keyword. When the client executes the "MICROSOFT WINDOWS" operating system, the win.ini file is also used. In the case of "MICROSOFT WINDOWS," there is actually a level of indirection in that the entry in the win.ini file refers to the SMS run executable. Therefore, the SMS run executable is started upon the startup of "MICROSOFT WINDOWS." Upon invocation, the SMS run executable then accesses the SMS run initialization file to determine the programs to start up and launches the programs contained therein. Therefore, when a program is added to the list of programs to start up, the program is added to the SMS run initialization file when "MICROSOFT WINDOWS" is the operating system of the client. If the client operates the "MS DOS" operating system, the client setup executable places an entry into the well-known autoexec.bat file. The entry specifies the pathname of the program to be invoked and, at startup of "MS DOS," the program is started. Upon the next invocation of the operating system after adding these entries, the operating system will automatically start these programs.

Next, the client setup executable determines whether a program needs to be deleted from the client (step 522). In this step, the client setup executable makes this determination by comparing the program list contained in the domain initialization file against the list of programs currently installed on the client as specified by the SMS initialization file. If it is determined to delete a program, the client setup executable deletes the entry referring to the program that causes the program to be started upon invocation of the operating system and deletes the program from the SMS initialization file (step 524). In this step, the client setup executable deletes the entry that indicates automatically starting the program, as described above. After deleting the entry, the client setup executable deletes the program from the secondary storage of the client (step 526). Next, the logon process ends by the operating system of the client being invoked and starting the programs that have been installed on the client (step 528). In this step, as previously described, the operating system of the client, as part of its startup processing, invokes certain programs that it is instructed to invoke.

While the present invention has been described with reference to a preferred embodiment thereof, those skilled in the art will know of various changes in form that may be made without departing from the spirit and scope of the claimed invention as defined in the appended claims.

We claim:

1. A data processing system having network services and software for installation, comprising:
   a client computer for utilizing the network services and for receiving the software; and
   a server computer communicatively linked to the client computer via a communication mechanism for providing the network services to the client computer, itself comprising:
   a sender services component for receiving the software for installation,
   an inventory processor component for receiving inventory information from the client computer via the communications mechanism,
   an inventory loader component for storing the inventory information received by the inventory processor component for retrieval by the server computer,
   a determination component using a scheduler subcomponent to automatically determine when to install the software onto the client computer, and
   an installation component using a despooler subcomponent to install the software onto the client computer from the server computer via the communication mechanism when it is determined to install the software onto the client computer and in response to the client computer logging onto the server computer, wherein the server computer is heterogeneous with respect to the client computer.

2. The data processing system of claim 1 wherein the software is a version of a program, and wherein the server computer includes a detection component for detecting when the version of the program is outdated and for installing a new version of the program onto the client computer.

3. The data processing system of claim 2 wherein the detection component has a deletion component for deleting the version of the program that is outdated before installing the new version of the program onto the client computer.

4. The data processing system of claim 1 wherein the client computer has an associated first natural language and wherein the server computer has an associated second natural language.

5. The data processing system of claim 1 wherein the client computer executes an operating system of a first type and wherein the server computer executes an operating system of a second type.

6. The data processing system of claim 1 wherein the client computer has a processor of a first type and wherein the server computer has a processor of a second type.

7. The data processing system of claim 1 wherein the server computer has a start component for starting the software on the client computer after the installation component installs the software.

8. The data processing system of claim 1 further comprising a centralized management system for managing the server computer and the client computer, wherein the software performs a function of the centralized management system.

9. The data processing system of claim 1 further comprising a second client computer for utilizing network services provided by the server computer and for having the software installed on the second client computer, wherein the second client computer is heterogeneous with respect to the first client computer.

10. The data processing system of claim 9, wherein the first client computer and the second client computer have processors that differ.

11. The data processing system of claim 9, wherein the first client computer and the second client computer execute operating systems that differ.

12. The data processing system of claim 9, wherein the first client computer and the second client computer have associated natural languages that differ.

13. In a data processing system having a first computer with software for installation on a second computer that stores local software and that has associated configuration characteristics that comprise characteristics of the local software and characteristics of a configuration of the second computer, the second computer having a processor type, an operating system type, and a current natural language, a method comprising the computer-implemented steps of:
   performing a first logon to the first computer by the second computer, the second computer having first associated configuration characteristics;
   performing a second logon to the first computer by the second computer, the second computer having second associated configuration characteristics;
   determining if the first associated configuration characteristics and the second associated configuration characteristics are equivalent; and
   when it is determined that the first associated configuration characteristics and the second associated configuration characteristics are not equivalent, selecting the software to install based on the second associated configuration characteristics of the second computer utilizing a software directory structure, the software directory structure storing different versions of the software, natural language-independent portions of the stored versions of the software being differentiated in the software directory structure at a first level by the processor type of the second computer and at a second level by operating system type of second computer, natural language-dependent portions of the stored versions of the software being differentiated in the software directory structure at a first level by the processor type of the second computer, at a second level by the operating system type of second computer, and at a third level based on the current natural language of the computer system, the selecting step selecting a natural language-independent portion of the stored versions of the software based upon the processor type and operating system type of the second computer and selecting a natural language-dependent portion of the stored versions of the software based upon the processor type, operating system type, and current natural language of the second computer, and installing the selected portions of software onto the second computer by the first computer.

14. The method of claim 13 wherein the second computer executes an operating system and wherein the first associated configuration characteristics and the second associated configuration characteristics include an indication of the operating system that is executing on the second computer.

15. The method of claim 14 wherein the software has a plurality of editions, each of the editions being suitable for execution with a given type of operating system, and wherein the step of installing the software includes installing one of the editions of the software suitable for execution with the operating system executing on the second computer during the second logon.

16. The method of claim 13 wherein the second computer has an associated natural language and wherein the first associated configuration characteristics and the second associated configuration characteristics include an indication of the associated natural language of the second computer.

17. The method of claim 16 wherein the software has a plurality of editions, each of the editions appropriate for use with a given natural language, and wherein the step of installing the software includes installing one of the editions of the software that is appropriate for use with the associated natural language of the second computer during the second logon.

18. In a data processing system having programs, a first computer having a first of the programs and a second computer having a second of the programs, wherein the first computer provides network services to the second computer after the second computer performs a logon to the first computer, a prescribed program list being available for access by the first computer system that lists programs to be stored on the second computer, a method comprising the steps of:

initiating a logon to the first computer by the second computer, wherein the second computer is heterogeneous with respect to the first computer;

during the logon, performing the following steps automatically by the first computer:

determining whether to copy the first program onto the second computer by accessing the prescribed program list and determining whether the first program is among the programs listed by the prescribed program list;

when it is determined to copy the first program onto the second computer based on a determination that the first program is among the programs listed by the prescribed program list, copying the first program from the first computer onto the second computer;

determining whether to delete the second program from the second computer by accessing the prescribed program list and determining whether the second program is among the programs listed by the prescribed programs list; and when it is determined to delete the second program from the second computer based upon a determination that the second program is not among the programs listed by the prescribed programs list, deleting the second program from the second computer; and completing the logon to the first computer.

19. The method of claim 18 wherein the second computer contains additional programs that have been copied from the first computer, the method further including the steps of identifying the additional programs that have been copied to the second computer and starting execution of the additional programs.

20. The method of claim 18 wherein the first computer has a processor of a first type and the second computer has a processor of a second type, wherein the programs have editions that are suitable for execution on a type of processor, wherein the step of copying the first program includes copying an edition of the first program that is suitable for execution on the second type of processor.

21. The method of claim 18 wherein the first computer executes an operating system of a first type and the second computer executes an operating system of a second type, wherein the programs have editions that are suitable for execution with a given type of processor, wherein the step of copying the first program includes copying an edition of the first program that is suitable for execution with the second type of operating system by utilizing commands suitable for the second type of operating system.

22. The method of claim 18 wherein the first computer has a first associated natural language and the second computer has a second associated natural language, wherein the first program has editions that are particular to a given natural language, wherein the step of copying the first program includes copying an edition of the first program that is particular to the second associated natural language.

23. The method of claim 18 wherein the data processing system is managed by an administrator, wherein the step of determining whether to copy the first program includes examining input of the administrator that specifies whether to copy the first program onto the second computer and whether to delete the second program from the second computer and wherein the step of determining whether to delete the second program includes examining the input of the administrator.

24. The method of claim 18 wherein the second computer executes an operating system, wherein the step of initiating a logon includes the second computer executing a first operating system, and the method further including the steps of:

initiating a second logon to the first computer by the second computer, the second computer executing a second operating system;

determining to copy the first program to the second computer based on the second computer not executing the first operating system; and copying the first program to the second computer.

25. The method of claim 18 wherein the second computer has an associated natural language, wherein the step of initiating a logon includes the second computer having an associated first natural language, and the method further including the steps of:
   initiating a second logon to the first computer by the second computer, wherein the second computer has an associated second natural language;
   determining to copy the first program to the second computer based on the second computer not having the first associated natural language; and
   copying the first program to the second computer.

26. The method of claim 18, wherein the programs have versions, wherein the second computer has a version of the first program, wherein the step of determining whether to copy the first program includes determining whether the version of the first program on the second computer is outdated and wherein the step of copying the first program includes copying the new version of the first program.

27. An automatic software installation system, comprising:
   a network for communicatively connecting a first computer to a second computer;
   the first computer having an associated natural language and a processor running an operating system; and
   the second computer for providing network services to the first computer after the first computer logs onto the second computer, and further comprising:
   a storage component for storing editions of software;
   a determination component for determining the associated natural language of the first computer, the operating system running on the first computer and the processor of the first computer; and
   a copy component for copying an edition of the software onto the first computer that is suitable for execution on the processor of the first computer, that is suitable for execution with the operating system running on the first computer and that is suitable for the associated natural language of the first computer, wherein the copy component automatically copies the edition of the software from the second computer to the first computer via the network by utilizing commands that are suitable for the operating system of the first computer in response to the first computer initiating a logon to the second computer, the copy component copying the edition of the software from a software directory structure, the software directory structure storing different editions of the software being differentiated in the software directory structure at a first level by the processor of the first computer, at a second level by the operating system running on the first computer, and at a third level by the associated natural language of the first computer.

28. A computer-readable medium whose contents cause a data processing system to perform processing, the data processing system having a first computer with software for installation on a second computer that stores local software and that has associated configuration characteristics that comprise characteristics of the local software and characteristics of a configuration of the second computer, the second computer having a processor type, an operating system type, and a current natural language, by performing the steps of:
   performing a first logon to the first computer by the second computer, the second computer having first associated configuration characteristics;
   performing a second logon to the first computer by the second computer, the second computer having second associated configuration characteristics;
   determining if the first associated configuration characteristics and the second associated configuration characteristics are equivalent; and
   when it is determined that the first associated configuration characteristics and the second associated configuration characteristics are not equivalent,
   selecting the software to install based on the second associated configuration characteristics of the second computer utilizing a software directory structure, the software directory structure storing different versions of the software, natural language-independent portions of the stored versions of the software being differentiated in the software directory structure at a first level by the processor type of the second computer and at a second level by operating system type of second computer, natural language-dependent portions of the stored versions of the software being differentiated in the software directory structure at a first level by the processor type of the second computer, at a second level by the operating system type of second computer, and at a third level based on the current natural language of the computer system, the selecting step selecting a natural language-independent portion of the stored versions of the software based upon the processor type and operating system type of the second computer and selecting a natural language-dependent portion of the stored versions of the software based upon the processor the operating system type, and current natural language of the second computer, and
   installing the selected portions of software onto the second computer by the first computer.

29. A computer-readable medium whose contents cause a data processing system to perform processing, the data processing system having programs, a first computer having a first of the programs and a second computer having a second of the programs, wherein the first computer provides network services to the second computer after the second computer performs a logon to the first computer, a prescribed program list being available for access by the first computer system that lists programs to be stored on the second computer, by performing the steps of:
   initiating a logon to the first computer by the second computer, wherein the second computer is heterogeneous with respect to the first computer;
   during the logon, performing the following steps automatically by the first computer:
   determining whether to copy the first program onto the second computer by accessing the prescribed program list and determining whether the first program is among the programs listed by the prescribed program list;
   when it is determined to copy the first program onto the second computer based on a determination that the first program is among the programs listed by the prescribed program list,
   copying the first program onto the second computer;
   determining whether to delete the second program from the second computer by accessing the prescribed program list and determining whether the second program is among the programs listed by the prescribed programs list; and
   when it is determined to delete the second program from the second computer based upon a determination that the second program is not among the programs listed by the prescribed programs list,
   deleting the second program from the second computer; and
   completing the logon to the first computer.

* * * * *